May 13, 1930.　　　　E. D. PHINNEY　　　　1,758,532
TEMPERATURE MEASURING DEVICE
Filed April 20, 1928
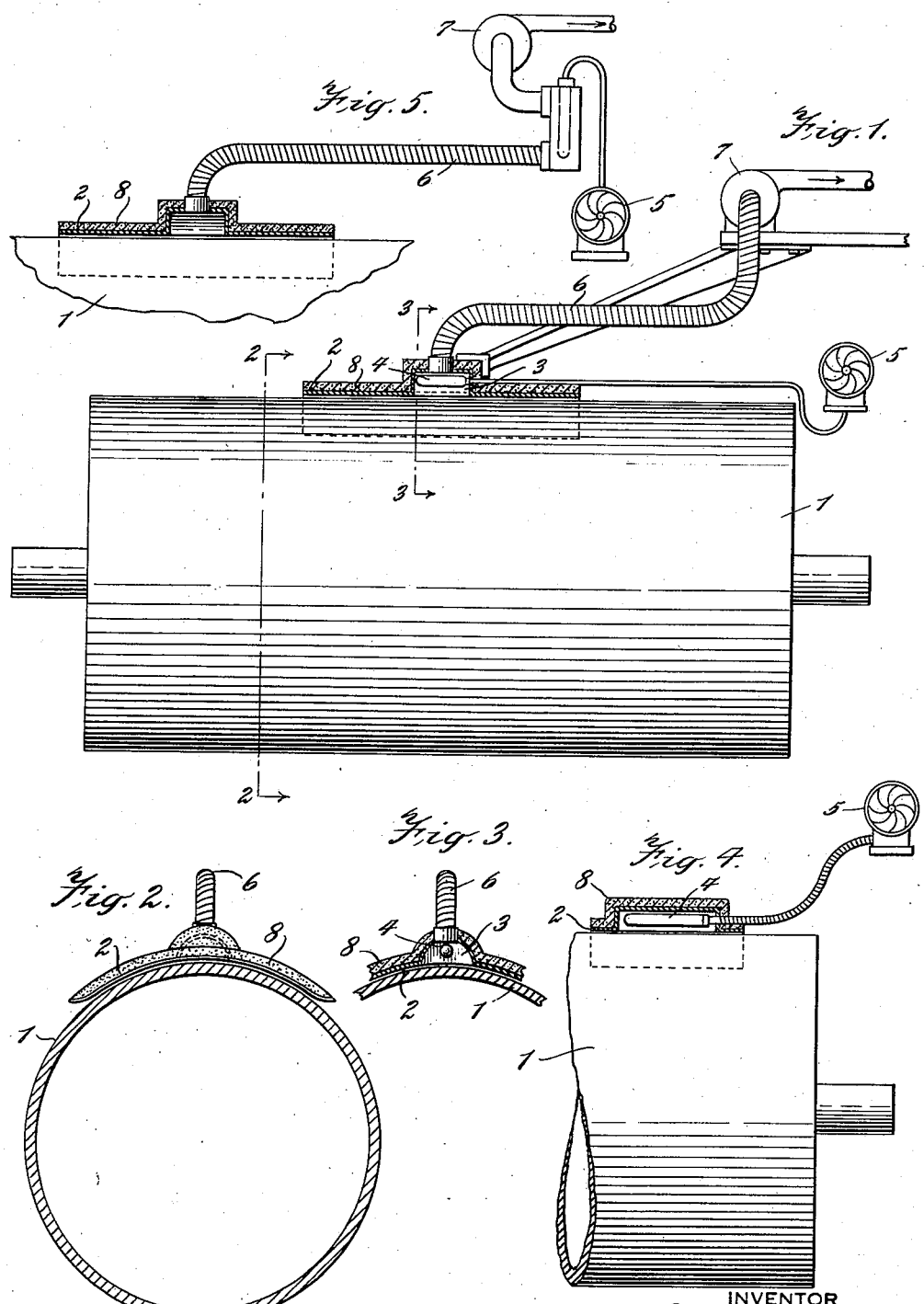
INVENTOR
Edward D Phinney
BY
ATTORNEY

UNITED STATES PATENT OFFICE

EDWARD D. PHINNEY, OF MOUNT VERNON, NEW YORK

TEMPERATURE-MEASURING DEVICE

Application filed April 20, 1928. Serial No. 271,442.

This invention relates to temperature measuring devices, particularly to devices for measuring the temperature of the surface of a heated roll or other moving body.

An object of the invention is the provision of an arrangement for drawing air over the surface of a roll and thereafter measuring the temperature of the said air.

Various methods and means have been devised for measuring the temperature of a moving surface, such, for example, as the surface of a heated roll. The usual method where the roll is hollow is to place on the inside thereof a thermometer bulb which, responsive to the temperature conditions inside of the roll, registers on a thermometer placed outside of the roll, thereby giving an indication as to the temperature that may be expected to exist at the outside surface of the roll. This type of measuring instrument has been used on paper making machines for determining the temperature of the drier roll. This method has the disadvantage that the temperature at the outside surface of the roll has to be judged by the temperature existing within the roll. As the temperature gradient from the outside to the inside of the roll may not always be the same, the temperature obtained may sometimes be fictitious. This fictitious reading may be due to any one of several things, for example, the temperature of the room within which the roll is operated may vary at times, thus causing the surface of the roll to be cooled more with respect to the temperature inside the roll at one time than at another time. Furthermore, the surface may become coated with particles of material such as are deposited on a drier roll by the damp sheet of paper passing thereover, which coating tends to lower the effective temperature of the surface of the roll, and many other conditions. Attempts have been made to place the thermometer bulb close to the outside surface of the revolving roll, in order to measure the temperature thereof. This, for example, has been tried out on paper machines, but has the disadvantage that the thermometer bulb is exposed to the atmosphere and does not collect a great deal of heat from the surface of the roll. Furthermore, that it is extremely difficult to get the thermometer bulb close enough to the surface of the roll to give any reasonably accurate measurement. One of the reasons for this difficulty is that paper machine dried rolls which are quite large, are usually constructed of cast metal and because of the cast metal not being uniform in quality or thickness and for other reasons, the surface of the roll warps somewhat, due to the temperature changes during operation of the machine. If the thermometer bulb is positioned sufficiently close to the surface of the roll to give a good reading at one time the roll may in a small interval of time warp sufficiently to rub the thermometer bulb, thereby besides possibly damaging the bulb, producing a fictitious temperature reading due to the heat of friction of the roll on the bulb.

It has been suggested in order to measure the temperature and humidity of a moving sheet, such as a sheet of paper passing through a paper machine, to blow a stream of air over the surface of the sheet, thereby causing the air to take up moisture and be heated, and thereafter determining the temperature and humidity of the air. In carrying out this process it has been the usual practice to utilize a member over which the sheet of paper passes in close contact, the said member having a channel therein, the open side of which is closed by the sheet of paper passing over the member in close contact therewith and blowing the air through the channel in this member. This arrangement works very satisfactorily for measuring the temperature of sheets of flexible or pliable material such as paper, this being due to the fact that the paper makes a very good closure for the open side of the groove in the member. However, this arrangement is not well adapted to use for measuring the temperature of a moving body of the nature of a cast iron roll or the like for the reason that the roll cannot form a good closure for the open side of the channel in the member and hence any air that has been blown into the channel for the most part escapes, thereby rendering it difficult to secure a proper reading of the thermometer. Even if the surface of the roll were perfectly round and uniform difficulty would be encountered in this respect, but where the roll is of the nature described above, that is, such that the surface thereof is warped and uneven to a certain degree, the difficulties encountered are magnified greatly. In accordance with my invention I avoid the objections above enumerated by providing a special form of shield or hood which fits over the surface of the roll closely adjacent thereto but out of contact therewith. This shield or hood is positioned as close to the surface of the roll or moving body as is practicable without touching the same and is made sufficiently wide with respect to the velocity of travel of the surface that any air reaching the center of the shield has travelled so far over the surface of the roll in such close contact therewith that the temperature of the air is substantially equal to that of the roll, or bears a perfectly definite ratio thereto. At the center of the shield or hood I provide a pocket within which a thermometer bulb may be located or from which air may be drawn and passed around a thermometer bulb at a distance.

In carrying out my invention either the roll may be depended upon to circulate the air in the pocket containing the thermometer bulb, this circulation being due to air being swept between the shield and the roll by the movement of the roll, or auxiliary means may be provided for drawing air between the shield and the roll into the pocket. The shield as pointed out above must be made sufficiently wide and placed sufficiently close to the surface of the roll so that air carried into the pocket by the movement of the roll or by the auxiliary means shall have to pass closely in contact with the heated surface of the roll over such a distance as to raise its temperature substantially to the temperature of the roll or to a value bearing a definite relation to that temperature. Where the movement of the roll surface is slow and the surface of the roll is substantially uniform and symmetrical the shield or hood does not have to be as wide as when the travel of the surface of the roll is rapid and that surface is warped thereby rendering the space between the shield and the roller surface variable. Where the roll surface is warped best results may be obtained by making the shield large enough to extend over a considerable space in order to insure uniformity of flow of air between the shield and surface. In carrying out the invention the shield or hood should be jacketed with some suitable heat insulating material such as asbestos or the like and if an auxiliary means is provided for drawing air between the surface of the roll and the shield, the connection of said auxiliary means should be likewise jacketed in order that the air shall not lose temperature by the cooling of the shield or connection by contact with the outside air. It will be noted that with a device constructed in accordance with my invention all air that reaches contact with the thermometer bulb must be heated to the temperature of the surface of the roll because the only air that reaches the said bulb passes between the shield and the roll surface.

The above mentioned and other objects and advantages and the manner of obtaining them will be made clear in the following detailed description taken in conjunction with the accompanying drawings.

In the drawings, Fig. 1 illustrates a device constructed in accordance with my invention applied to a roll.

Fig. 2 is a section taken along line 2—2 of Fig. 1.

Fig. 3 is a section taken along lines 3—3 of Fig. 1.

Fig. 4 shows a modified form of the device.

Fig. 5 illustrates still another embodiment of my invention.

Referring more particularly to the drawings, reference numeral 1 indicates a roll having placed closely adjacent thereto a hood 2 having a pocket 3 within which is positioned a thermometer bulb 4. The thermometer bulb 4 is connected in the usual well known fashion to a thermometer 5 which may be either of the recording or indicating type. Connected with pocket 3 is a suction pipe 6 which connects with a suction fan 7 driven by any suitable means. The hood 2 is covered with asbestos or other suitable material 8 in order to prevent heat radiation therefrom. In the modification of the device shown in Fig. 4 no auxiliary means is provided for drawing air into the hood as in this case the rotation of the roll is relied on for that purpose, air being carried into the hood by the movement of the surface of the roll. It is desirable to place the bulb 4 in the position shown in Fig. 1 in order that the temperature of the air surrounding the bulb will be as nearly equal as possible to that of the surface of the roll. By placing the bulb in this position any drop in temperature due to the heated air passing through an exhaust pipe is avoided. In some cases it may be found desirable to place the bulb 4 in a pocket in the exhaust pipe, as shown in Fig. 5.

While I have disclosed a particular embodiment of my invention for the purpose of illustration it will be understood that various modifications and adaptations such as would occur to one skilled in the art may be made without a departure from the spirit of the invention, as set forth in the appended claims.

What I claim is:

1. A temperature measuring device for a heated roll, comprising a hood conforming to the curvature of the roll and spaced a slight distance therefrom, the hood having an opening intermediate the edges thereof, means for drawing air between said hood and said roll and out of said opening and a temperature measuring device positioned in the air stream drawn over said roll.

2. A measuring device for determining the temperature of a moving surface comprising a hood positioned adjacent a portion of said surface, said hood having a pocket with a flange extending from all sides thereof parallel to the said surface and spaced but a slight distance therefrom, the width of said flange being several times said distance, and means for measuring the temperature of the atmosphere of said pocket.

3. A measuring device for determining the temperature of a moving surface comprising a hood positioned adjacent a portion of said surface, said hood having a pocket with a flange extending from all sides thereof parallel to said surface and spaced a slight distance therefrom, means for drawing air into said hood between said flange and said surface and means for measuring the temperature of the atmosphere of said pocket.

4. Means for determining the temperature of a moving body having an uneven surface, said means comprising a hood positioned adjacent said surface and but a slight distance therefrom, said hood extending over a representative uneven portion of said surface, means for withdrawing air from said hood so as to cause air to flow into the hood between said surface and said hood, and means for measuring the temperature of the air being withdrawn.

5. In a temperature measuring device for a heated roll, means for passing air over the surface of said roll for a distance in close contact therewith, said means comprising a hood having a chamber and a flange extending from all sides thereof, the flange being spaced from the roll but a slight distance, the width of the flange being several times said distance, and means for measuring the temperature of the air within the chamber.

6. Means for determining the temperature of a moving body having an uneven surface, comprising a hood positioned adjacent said surface, and extending over a representative uneven portion of said surface, said hood comprising a chamber having a flange portion extending on all sides, said flange being spaced but a slight distance from said surface and having a width several times said distance, means for withdrawing air from said chamber so as to cause air to flow into the chamber between said surface and said hood, and means for measuring the temperature of the air being withdrawn.

7. Means for determining the temperature of a moving surface comprising a shield spaced but a slight distance from said surface, means for drawing air between the surface and shield from the outer edges of the shield inwardly and means for measuring the temperature of the air intermediate the edges of the shield.

In testimony whereof, I have signed my name to this specification this 18th day of April, 1928.

EDWARD D. PHINNEY.